J. MEIER.
CENTRIFUGAL SUCTION FAN.
APPLICATION FILED MAR. 1, 1913.

1,089,572.  Patented Mar. 10, 1914.

WITNESSES
Fenton H. Belt
J. H. Sherwood

INVENTOR
John Meier
By Franklin H. Hough
Attorney

UNITED STATES PATENT OFFICE.

JOHN MEIER, OF DALLAS, TEXAS, ASSIGNOR OF ONE-HALF TO T. S. MILLER, JR., OF DALLAS, TEXAS.

CENTRIFUGAL SUCTION-FAN.

1,089,572.  Specification of Letters Patent.  Patented Mar. 10, 1914.

Application filed March 1, 1913  Serial No. 751,544.

*To all whom it may concern:*

Be it known that I, JOHN MEIER, a citizen of the United States, residing at Dallas, in the county of Dallas and State of Texas, have invented certain new and useful Improvements in Centrifugal Suction-Fans; and I do hereby declare the following to be a full, clear, and exact description of the invention, such as will enable others skilled in the art to which it appertains to make and use the same, reference being had to the accompanying drawings, and to the letters and figures of reference thereon, which form a part of this specification.

This invention relates to new and useful improvements in pneumatic suction fans for use in cotton picking machines and comprises means whereby the cotton and the seed as they are picked from the boll of the plant may be forcibly drawn through a casing without any danger of injuring the cotton or seed.

Another and an essential feature of the present invention consists in the provision of a casing having inlet and exit passageways leading thereto with a fan mounted eccentrically within the casing and so arranged that the size of the passageway through the casing will increase in width from the inlet to the exit ends thereof, thus reducing to a minimum the obstructions for the passage of the cotton as it passes through the casing.

I illustrate my invention in the accompanying drawings, in which:—

Figure 1:
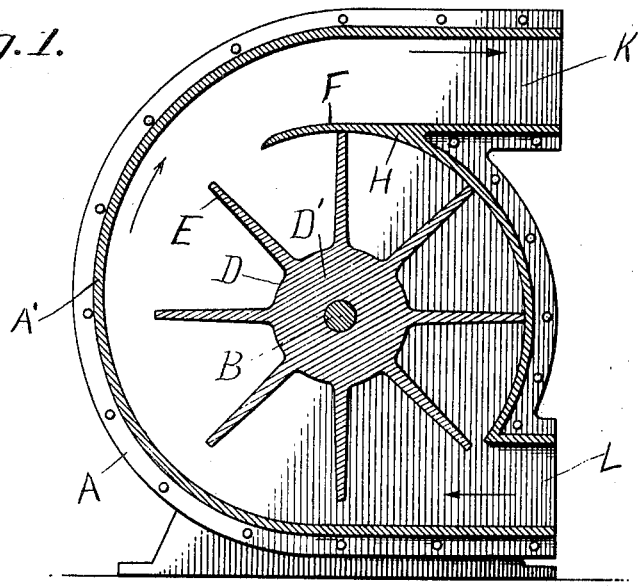
Figure 2:
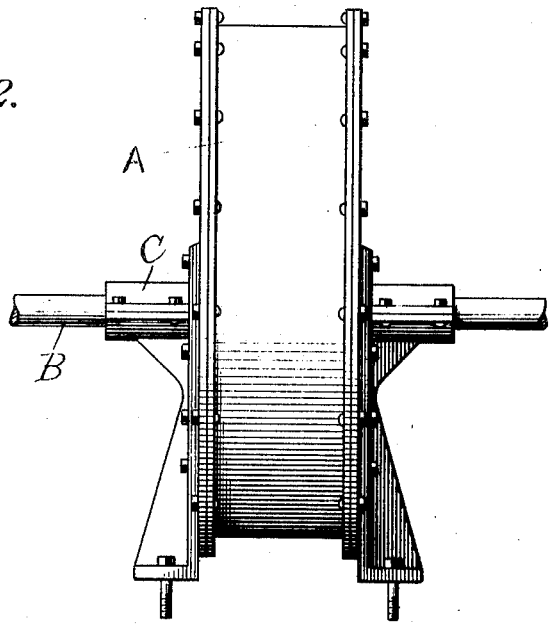

Figure 1 is a central vertical sectional view through a fan and casing embodying the features of my invention, and Fig. 2 is a side elevation of the casing showing a fan shaft mounted in suitable bearings in the casing.

Reference now being had to the details of the drawings by letter, A designates a casing which is semi-cylindrical upon one side and is provided with an inlet opening or passageway L and an exit passageway K which are parallel to each other and spaced apart and which in practice are adapted to communicate with passageways whereby cotton from the boll of the plant may be drawn into the casing and forcibly ejected through the side opening and deposited at any suitable location.

Mounted in suitable bearings C upon the casing is a shaft B to which is fixed a suction wheel D, having a hub portion D', which may be of any suitable diameter, preferably of the size shown in the drawings or even larger, if desired, and radiating from said hub are the fan blades E. Upon reference to Fig. 1 of the drawings, it will be noted that said shaft is mounted eccentrically within the casing and the concaved wall intermediate the inlet and exit passageway of the casing has a projecting portion F underneath which the blades turn and in close contact therewith, while a space intervenes between the ends of the wings and the bottom of the inlet passageway and the inner concaved wall H, the distance between the outer ends of the wings and the concaved wall A' increasing as they turn toward the exit passageway K, thus leaving an unobstructed passageway for the cotton and seed contained therein.

By reason of the projecting part F, which is continuous with the concaved surface H, and as the ends of the blades or wings turn in close proximity to the inner concaved surface of said projection and the concaved wall H, a counter or reverse suction through the lower part of the passageway K will be avoided.

In operation, the fan being caused to rotate rapidly, a suction of sufficient force will be produced to cause the cotton to be drawn through the casing in the direction of the arrows without coming in contact with the blades or wings of the fan. Owing to the gradually increasing width of the space through the casing and forming the path for the cotton, the latter will be thrown out by the force of suction against the concaved surface without the wings injuring the cotton or breaking the seed, the passageway being unobstructed by reason of the fan being located eccentrically.

By the provision of the solid hub portion of the fan occupying a considerable amount of the space intermediate the shaft and the outer ends of the blades, the formation of eddies of air near the center of the fan will be avoided.

What I claim to be new is:—

1. A suction fan for cotton picking apparatus comprising a casing having an inlet and an exit opening, the opposite circumferential walls of the casing being on arcs of circles of different diameters, a fan mounted eccentrically within the space intermediate said concaved walls, the blades of the fan being adapted to turn adjacent to the concaved wall which is upon the arc of the smaller circle, the passageway for the cotton to be fed through the casing increasing in capacity from the inlet to the exit openings of the casing, as set forth.

2. A suction fan for cotton picking apparatus comprising a casing having an inlet and an exit opening, the opposite circumferential walls of the casing being on arcs of circles of different diameters, a fan journaled eccentrically between said concaved surfaces and being of a diameter equal to the diameter of the concaved wall on the arc of the smaller circle, the wall of the exit opening projecting beyond the inlet opening to the casing and concaved upon its under surface and underneath and adjacent to which the fans are adapted to turn, as set forth.

3. A suction fan for cotton picking apparatus comprising a casing having an inlet and an exit opening, a fan mounted eccentrically in the casing between said concaved surfaces and having a solid hub portion with radial wings in the circumference thereof, the ends of which are adapted to turn adjacent to the concaved wall which is on the arc of the smaller of the two circles, a passageway through the casing increasing in width from the inlet to the exit openings in the casing, as set forth.

In testimony whereof I hereunto affix my signature in the presence of two witnesses.

JOHN MEIER.

Witnesses:
 A. L. HOUGH,
 A. R. FOWLER.